(12) United States Patent
Krishnan Jamuna et al.

(10) Patent No.: US 11,879,431 B2
(45) Date of Patent: Jan. 23, 2024

(54) CORRECTING BLADE PITCH IN A WIND TURBINE

(71) Applicant: Vestas Wind Systems A/S, Aarhus N. (DK)

(72) Inventors: Karthik Krishnan Jamuna, Trivandrum (IN); Igor Kelbas, Mårslet (DK); Selvavignesh Vedamanickam, Chennai (IN); Maxime Coulange, Boisseron (FR); Jiji Nallathambi Kumaradhas, Beder (DK); Jesper Errboe Askov, Silkeborg (DK); Karl H. Svendsen, Hadsten (DK); Edgar Anahua, Rønde (DK); Nikolaj Sig Overgaard, Aarhus C (DK)

(73) Assignee: Vestas Wind Systems A/S, Aarhus (DK)

(*) Notice: Subject to any disclaimer, the term of this patent is extended or adjusted under 35 U.S.C. 154(b) by 131 days.

(21) Appl. No.: 17/628,704

(22) PCT Filed: Jul. 7, 2020

(86) PCT No.: PCT/DK2020/050204
§ 371 (c)(1),
(2) Date: Jan. 20, 2022

(87) PCT Pub. No.: WO2021/018358
PCT Pub. Date: Feb. 4, 2021

(65) Prior Publication Data
US 2022/0316442 A1    Oct. 6, 2022

(30) Foreign Application Priority Data
Jul. 30, 2019 (DK) .......................... PA 2019 70483

(51) Int. Cl.
*F03D 7/02* (2006.01)

(52) U.S. Cl.
CPC .......... *F03D 7/0224* (2013.01); *F03D 7/024* (2013.01); *F03D 7/0292* (2013.01);
(Continued)

(58) Field of Classification Search
CPC ...... F03D 7/0224; F03D 7/024; F03D 7/0292; F03D 7/0296; F03D 7/0298; F03D 13/35; F05B 2270/328; F05B 2270/334
See application file for complete search history.

(56) References Cited

U.S. PATENT DOCUMENTS

| 10,738,762 | B2 * | 8/2020 | Østergaard | F03D 7/0276 |
| 2012/0183399 | A1 * | 7/2012 | Perkinson | F03D 17/00 |
| | | | | 416/1 |

(Continued)

FOREIGN PATENT DOCUMENTS

| DE | 102014118258 A1 | 6/2016 | | |
| EP | 2620639 A1 * | 7/2013 | ........... | F03D 7/0224 |

(Continued)

OTHER PUBLICATIONS

Danish Patent and Trademark Office, Search and Examination Report in PA 2019 70483, dated Jan. 10, 2020.
(Continued)

*Primary Examiner* — Brian Christopher Delrue
(74) *Attorney, Agent, or Firm* — Wood Herron & Evans LLP

(57) ABSTRACT

There is provided a method (40) of correcting blade pitch in a wind turbine (10) having a tower (12) and a plurality of rotor blades (18). The method (40) comprises: receiving (410) sensor output data from one or more wind turbine sensors (141), the sensor output data including data indicative of excitation of the tower (12) for a plurality of different pitch angles of a particular one of the blades (18); determining (420) a corrected pitch reference of the particular
(Continued)

blade (18), the corrected pitch reference corresponding to a minimum tower excitation based on the received sensor output data; and, sending (430) the corrected pitch reference to a pitch actuator system (24) of the particular blade (18).

12 Claims, 4 Drawing Sheets

(52) U.S. Cl.
CPC ......... *F03D 7/0296* (2013.01); *F03D 7/0298* (2023.08); *F05B 2270/328* (2013.01); *F05B 2270/334* (2013.01)

(56) References Cited

U.S. PATENT DOCUMENTS

| | | |
|---|---|---|
| 2017/0234300 A1 | 8/2017 | Brodsgaard et al. |
| 2018/0142676 A1* | 5/2018 | Pedersen ................ F03D 7/024 |

FOREIGN PATENT DOCUMENTS

| | | | |
|---|---|---|---|
| EP | 2620639 A1 | 7/2013 | |
| EP | 2679810 A2 | 1/2014 | |
| WO | WO-2008067814 A2 * | 6/2008 | ............. F03D 1/008 |
| WO | 2010016764 A1 | 2/2010 | |
| WO | 2015086023 A1 | 6/2015 | |
| WO | 2016150442 A1 | 9/2016 | |
| WO | WO-2016150442 A1 * | 9/2016 | ........... F03D 7/0224 |

OTHER PUBLICATIONS

European Patent Office, International Search Report and Written Opinion in PCT/DK2020/050204, dated Oct. 19, 2020.

* cited by examiner

CORRECTING BLADE PITCH IN A WIND TURBINE

TECHNICAL FIELD

The present invention generally relates to correcting pitch of the rotor blades of a wind turbine.

BACKGROUND

Wind turbines known in the art comprise a tower supporting a nacelle and a rotor with a number of rotor blades. The rotor blades are typically pitch-adjustable; each blade is rotatable about a longitudinal axis of the blade by a pitch actuator. The pitch of each blade is adjusted to change the angle of attack of the blade, in order to alter the blade's characteristics with respect to the wind. Adjusting the pitch of rotor blades adjusts the drag and lift experienced by the blade, and therefore changes the loading experienced by the blade.

When pitching blades, misalignment of the blades to their expected positions—also referred to as rotor imbalance—may cause higher than expected loads. By misalignment, it is meant that the rotor blade has an actual pitch angle that differs from an expected pitch angle. Any degree of misalignment in pitch changes the loading experienced by the blades. A large degree of misalignment in one or more blades may result in relatively high loads being experienced, leading to increased wear on components connecting the blade to the rotor, or even failure of the blade.

Conventionally, blade misalignment and rotor imbalance is identified using a complex series of on-site measurements using large and complex measurement apparatus. As engineers need to be present on-site, and apparatus needs to be mounted to the wind turbines, the turbines may need to be taken out of operation for several days. Over an entire farm, this can result in a large amount of lost generating capacity.

US2012/018339 A1 discloses a method for balancing blades of a wind turbine where the blades of the wind turbine are pitched according to a corrected pitch configuration.

It is against this background that the present invention has been developed.

SUMMARY OF THE INVENTION

According to an aspect of the present invention there is provided a method of controlling blade pitch in a wind turbine having a tower and a plurality of rotor blades. The method comprises receiving sensor output data from one or more wind turbine sensors. The sensor output data includes data indicative of excitation of the tower for a plurality of different pitch angles of a particular one of the blades. The method comprises determining a corrected pitch reference of the particular blade corresponding to a minimum tower excitation based on the received sensor output data. The method comprises sending the corrected pitch reference to a pitch actuator system of the particular blade.

The received sensor output data may correspond to a pitch angle of the remaining blades being constant. The remaining blades are those blades of the wind turbine other than the particular blade for which corrected pitch reference is determined.

In some examples, determining the corrected pitch reference comprises determining a pitch offset from a current pitch reference to the pitch angle corresponding to the minimum tower excitation. In some examples, the corrected pitch reference is determined to be the current pitch reference shifted by the determined pitch offset.

The sensor output data for the plurality of different pitch angles may comprise sensor output data for the current pitch reference.

In some examples, determining the corrected pitch reference comprises determining a component of tower excitation in a particular direction from the received sensor output data. In some examples, the corrected pitch reference is determined based on the component of tower excitation.

In some examples, determining the corrected pitch reference based on the component of tower excitation comprises filtering the component of tower excitation for each of the plurality of different pitch angles to determine fatigue content of the tower excitation for each of the plurality of different pitch angles. In some examples, the corrected pitch reference is determined as pitch angle corresponding to a minimum value of fatigue content.

The particular direction of the component of tower excitation may be a fore-aft direction of the wind turbine tower.

The method comprises operating the wind turbine at each of the plurality of pitch angles of the particular blade for a predetermined period to receive the sensor output data for the plurality of different pitch angles of the particular blade.

The method comprises, for each of the plurality of pitch angles, calculating a mean operating condition of the wind turbine for each of a plurality of time intervals within the predetermined period using the sensor output data, and selecting a particular one of the time intervals in which the mean operating condition is within a predetermined tolerance. The corrected pitch reference may be determined based on the sensor output data of the selected particular time interval, for each of the plurality of pitch angles.

The operating condition may be calculated based on at least one of: average wind speed; air density; and, rotor speed.

The method may be repeated to determine corrected pitch reference for each of the plurality of rotor blades.

The method may be performed successively for each of the rotor blades until the corrected pitch reference for each of the blades converges to within a prescribed tolerance.

The one or more wind turbine sensors may comprise one or more accelerometers mounted to or in the wind turbine.

According to another aspect of the present invention there is provided a non-transitory, computer-readable storage medium storing instructions thereon that when executed by a processor causes the processor to perform the method described above.

According to another aspect of the present invention there is provided a controller for controlling blade pitch in a wind turbine having a tower and a plurality of rotor blades. The controller may be configured to receive sensor output data from one or more wind turbine sensors. The sensor output data may include data indicative of excitation of the tower for a plurality of different pitch angles of a particular one of the blades. The controller may be configured to determine a corrected pitch reference of the particular blade corresponding to a minimum tower excitation based on the received sensor output data. The controller may be configured to send the corrected pitch reference to a pitch actuator system of the particular blade.

According to another aspect of the present invention there is provided a wind turbine comprising a controller as described above.

BRIEF DESCRIPTION OF THE DRAWINGS

One or more embodiments of the invention will now be described, by way of example only, with reference to the accompanying drawings, in which.

DETAILED DESCRIPTION

Figure 1:
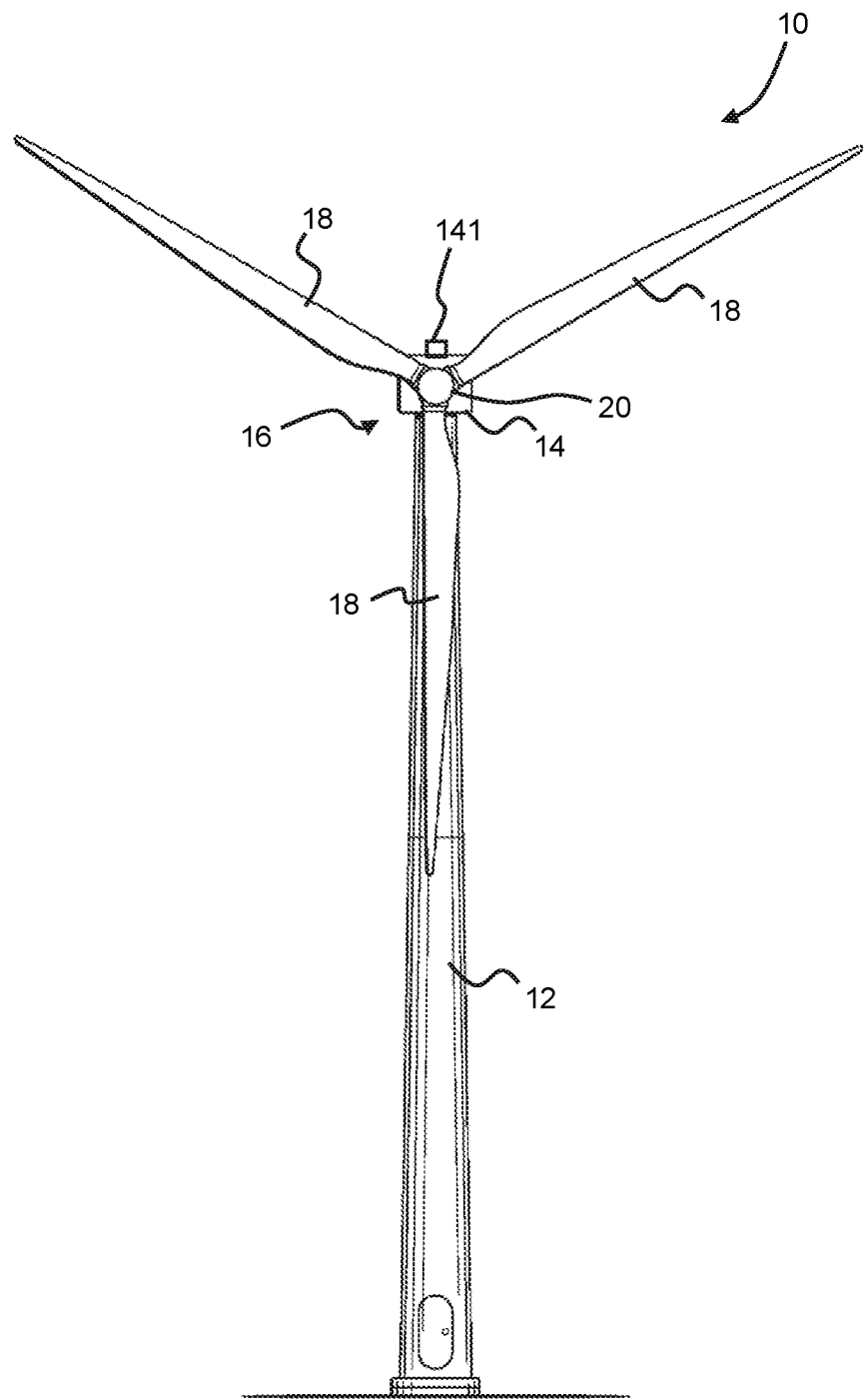
FIG. 1 shows a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible.

Shown mounted on the wind turbine 10, in particular on the nacelle 14, is an accelerometer 141. In other examples, the accelerometer 141 may be mounted on or within any suitable part of the wind turbine, as would be readily understood by the skilled person. Indeed, the wind turbine 10 may include any suitable number of accelerometers. Commonly, a plurality of accelerometers may be mounted or attached to one or more of the main bearings, gearbox and generator of a wind turbine.

The accelerometer 141 is arranged to measure a change in velocity or speed associated with the wind turbine 10. In particular, the accelerometer 141 is arranged to measure excitation or vibration of the wind turbine tower 12. Imbalance in the rotor 16, i.e. misalignment of the pitch of the blades 18 from a reference pitch, causes vibration in the tower 12 during operation of the wind turbine 10. Specifically, tower excitation is proportional to rotor imbalance and so the measurements from the accelerometer 141 indicative of tower excitation may be used to identify, and correct for, pitch misalignment, as will be described below.

The wind turbine 10 may include further sensors. For instance, a rotor wind speed detector may be provided—such a measurement may be performed in several ways as the skilled person will appreciate, one being through LIDAR as the skilled person will appreciate from the literature of wind turbine design and control. Also, a rotational speed sensor may be provided—this may be, for example, in the form of a rotary encoder on a generator shaft of the wind turbine 10; however, the rotor speed may be determined in any suitable manner as will be understood by the skilled person.

Figure 2:
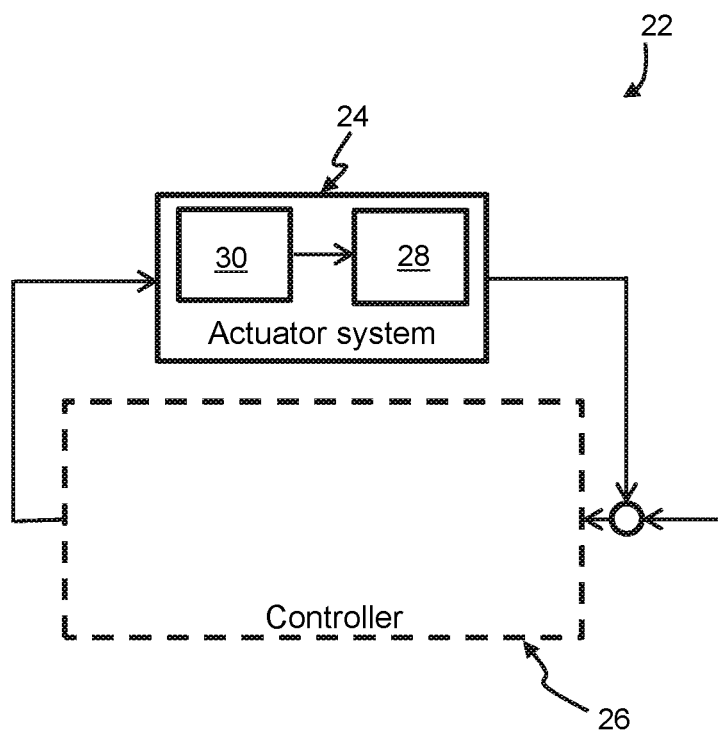
FIG. 2 shows a controller of the wind turbine of FIG. 1, and a pitch actuator system of the wind turbine to be controlled by the controller.

FIG. 2 shows a wind turbine control system 22 in accordance with an example of the invention which may be implemented in the wind turbine 10 of FIG. 1. Here, the control system 22 includes a pitch actuator system 24 that is controlled by a controller 26. The pitch actuator system 24 is, or includes, a system for controlling the pitch of one or more of the wind turbine blades 18 which in turn may include a hydraulic actuator 28 arranged to adjust blade pitch in a known manner. The actual position of the actuator 28 is controllable by an actuator position control unit 30 which provides a positioning command signal to the hydraulic actuator 28.

One or more functional units of the controller 26 may be provided by suitable software running on any suitable computing substrate using conventional or customer processors and memory. Different functional units of the controller 26 may use a common computing substrate (for example, they may run on the same server) or separate substrates, or one or each may themselves be distributed between multiple computing devices.

It should be appreciated that the controller 26 and pitch actuator system 24 may be replicated for each of the blades 18 of the wind turbine 10 so that the position of each blade 18 may be controlled independently—in some examples this may be done to provide individual pitch control or adjustment for each blade 18.

In one example method of the invention, an error in a reference pitch of each of the blades 18, i.e. pitch misalignment, is identified and corrected based on measured tower vibration. In particular, measured data indicative of tower excitation for a plurality of different pitch angles of a particular one of the blades 18 is received. A pitch angle of the particular blade 18 corresponding to a minimum tower excitation is then determined to be a correct pitch reference angle of the particular blade 18, and this correct pitch reference is sent to the pitch actuator system 24, which can then use the correct pitch reference to control pitch of the particular blade 18. This is described in greater detail below.

As mentioned above, during normal operation of the wind turbine 10 the blades 18 are controlled to be oriented towards a direction of incoming airflow. If the blades 18 are not aligned properly with the rotor hub 20 then pitch control of the blades 18 in this way will result in a difference between the orientation of the blades 18 and the direction of incoming airflow, resulting in rotor imbalance. The rotor blades 18 have a TC (Tube Cut) mark which should be at 0 degrees to the rotor hub 20 for a properly aligned and calibrated blade. The TC mark being offset from 0 degrees causes rotor imbalance—the TC mark being offset may be caused by, for instance, manufacturing tolerance, lack of maintenance, or blade replacement. The 0 degrees mark may be considered as a reference pitch angle of the blades 18.

The present method describes identifying pitch misalignment by identifying the degree to which each of the blades 18 is offset from the reference pitch, and then correcting for this offset. In particular, the wind turbine 10 is operated for a variety of different blade pitch angles for a particular one of the blades 18 while keeping the pitch angle of the remaining blades 18 constant. For each of these pitch angles, an indication of tower vibration is determined by the controller 26 from measurements from the accelerometer 141. The pitch angle corresponding to the smallest or minimum tower vibration is identified, and an offset between this identified pitch angle and a pitch angle corresponding to the reference pitch, e.g. 0 degrees, is determined by the controller 26. A corrected pitch reference is the reference pitch angle shifted by the determined pitch offset, and the controller 26 sends or transmits one or both of the corrected pitch reference or the pitch offset to the pitch actuator system 24. The process is then repeated for each of the remaining blades 18 in turn.

In a described example, the measured tower vibration or excitation is quantified in a particular way. A component of tower excitation in a particular direction is determined or streamed by the accelerometer 141 for a defined period of time. In the described example, the component of tower excitation in a fore-aft direction of the wind turbine 10 is used. The fore-aft direction may be considered as tower movements in a plane into the page as shown in the wind turbine of FIG. 1. The received fore-aft tower vibration data is used to identify a number of vibration or cycles within the rotational frequency of the wind turbine, i.e. the 1P frequency. In particular, the number of cycles may be identified using a known method such as Rain Flow Counting. Any other suitable method for identifying the number of cycles may be used, as will be understood by the skilled person. Specifically, the identified number of cycles is referred to hereinafter as the 1P fatigue content or, simply, fatigue content. The fatigue content and, in particular, a blade pitch angle corresponding to a minimum fatigue content, will be used to determine the corrected pitch reference and/or pitch offset of a particular blade, as described below.

A specific example implementing the approach outlined above in the controller 26 is now described. A first one of the blades 18 is selected. The pitch angle of this particular blade 18 is adjusted to a particular value, e.g. in the present example the pitch is set to −0.6 degrees. The pitch angle of the remaining two blades 18 is kept constant at 0 degrees. The wind turbine 10 is then operated in such a configuration for a predetermined period of time—which may be any suitable period, e.g. minutes, hours, days, etc., e.g. 10 minutes—during which the accelerometer 141 measures acceleration of the tower 12. The fatigue content associated with this particular blade configuration is determined by the controller 26 as described above.

The pitch angle of the first one of the blades 18 is then changed or offset from −0.6 degrees by a defined amount. In the described example, the blade pitch is offset by 0.3 degrees from −0.6 degrees to −0.3 degrees. The pitch of the other two blades 18 is kept the same. The wind turbine 10 is then operated in this configuration as before for a predetermined period of time, with the fatigue content being determined based on the sensor output data from the accelerometer 141 received during this predetermined period. The process is repeated for a plurality of different pitch angles of the first blade 18 while keeping the pitch angle of the remaining blades 18 constant. In the described example, the method is performed for the following pitch angles of the first blade 18: −0.6, −0.3, 0, +0.3, +0.6 degrees. The skilled person will readily understand that any suitable plurality of pitch angles of the first blade may be chosen.

Figure 3:
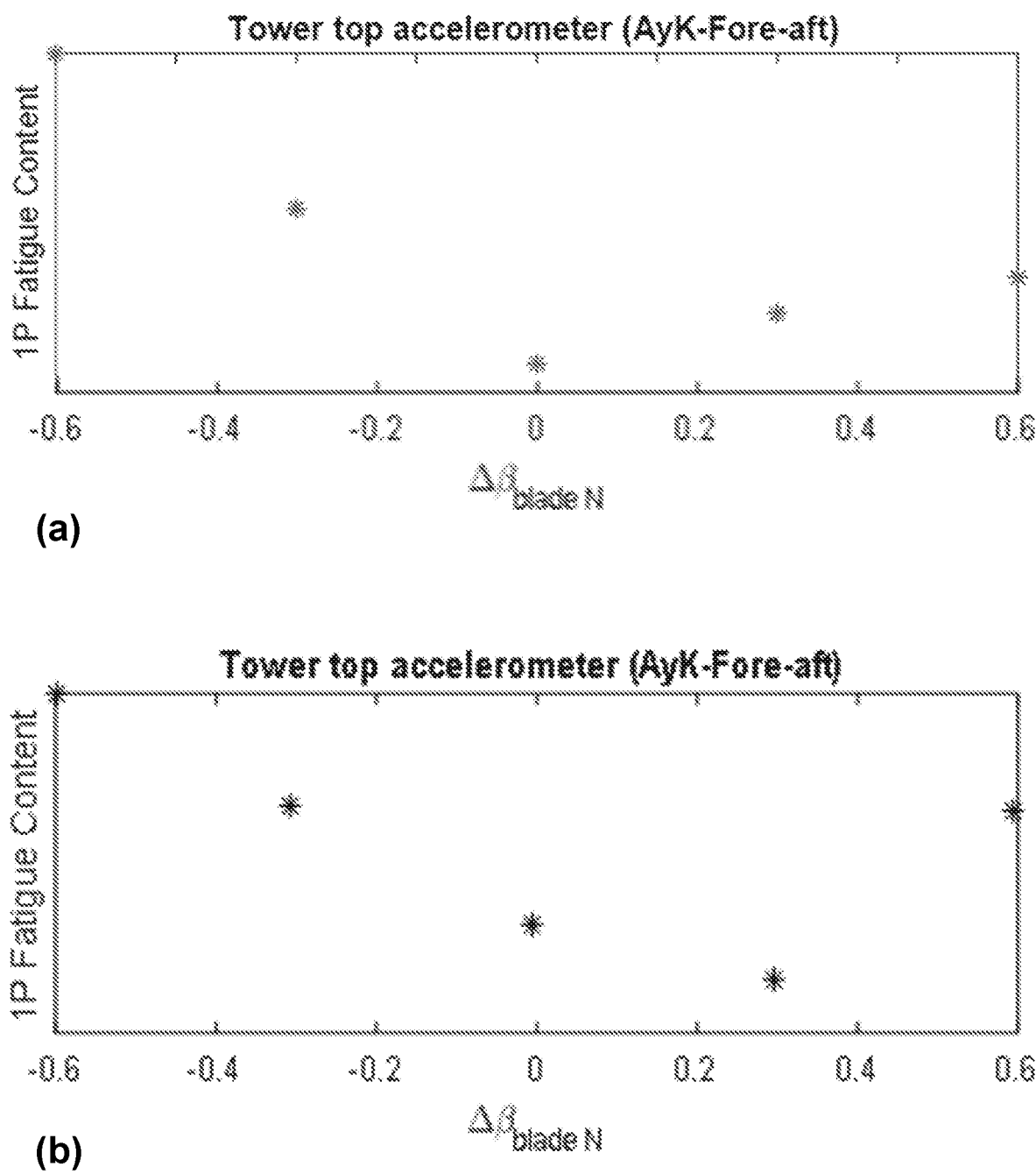
FIGS. 3(a) and 3(b) illustrate plots of fatigue content against blade pitch angle for a rotor blade of the wind turbine of FIG. 1 according to examples of the invention; and, FIG. 4 outlines the steps of a method executed by the controller of FIG. 2 according to an example of the invention.

Once the fatigue content associated with each of the plurality of pitch angles of the first blade 18 has been determined, the controller 26 determines which of these pitch angles has the lowest or minimum fatigue content. FIG. 3(*a*) shows a plot of fatigue content against pitch angle for the first blade 18 in one example. It is seen that the data points follow a generally parabolic trend with a single, global minimum. It is further seen that in this example the fatigue content is at its minimum at a pitch angle of 0 degrees. FIG. 3(*b*) shows a plot of fatigue content against pitch angle for the first blade 18 in another example. Similarly to FIG. 3(*a*), in FIG. 3(*b*) it is seen that the data points follow a generally parabolic trend with a single, global minimum. Unlike in FIG. 3(*a*), however, in FIG. 3(*b*) it is seen that in this example the fatigue content is at its minimum at a pitch angle of +0.3 degrees.

A current pitch reference of the first one of the blades may be at 0 degrees (as described above). In the example shown in FIG. 3(*a*), therefore, the minimum fatigue content corresponds with the current reference pitch angle of the first blade 18. Hence, no correction or offset is needed, and so the current pitch reference is the correct pitch reference. That is, there is zero pitch error and so zero offset to the current pitch reference is needed. In the example shown in FIG. 3(*b*), however, the minimum fatigue content does not correspond with the current reference pitch angle of the first blade 18. That is, the minimum fatigue content is not at 0 degrees. Instead, the minimum fatigue content occurs at +0.3 degrees.

The controller 26 therefore determines that the corrected reference pitch angle is at +0.3 degrees, i.e. the pitch reference is to be offset or shifted from the current pitch reference (0 degrees) by an offset of 0.3 degrees to +0.3 degrees.

Once the corrected pitch reference has been determined, the controller 26 is configured to send the corrected pitch reference, and/or the offset to the current pitch reference, of the first one of the blades to the pitch actuator system 24, which adjusts or offsets the pitch of the first one of the blades 18 accordingly. This corrected pitch reference then becomes the (updated or new) current pitch reference of the first one of the blades 18.

A second one of the blades is then selected, and the process outlined above for the first one of the blades 18 is repeated for the second one of the blades 18. That is, the wind turbine 10 is operated for a predetermined period of time for each of a plurality of pitch angles, and fatigue content associated with each of the plurality of pitch angles is determined. The pitch of the other two blades 18 is kept constant during this process. In particular, note that the first one of the blades 18 is kept constant at its corrected blade reference pitch angle. A corrected blade pitch reference for the second one of the blades 18 is determined in the same manner as described above, and the pitch actuator system 24 offsets the pitch of the second blade 18 by the appropriate amount so that the second blade 18 is updated to its corrected pitch reference.

The third, and final, one of the blades 18 is then selected, and the process is again repeated to determine and implement a corrected pitch reference for this blade 18.

As the pitch reference of the second and third ones of the blades 18 may have changed since the corrected pitch reference of the first one of blades 18 was determined, then a further correction to the pitch reference of the first one of the blades 18 may be needed. This is because the pitch angle of the first blade 18 having the lowest associated fatigue content may be different when the wind turbine 10 is operated with the second and third blades 18 held constant at their corrected pitch reference (rather than their previous pitch reference). As such, the above-described process is repeated for the first one of the blades to determine a (further) corrected pitch reference. Indeed, this process may be repeated until the corrected pitch reference for each of the plurality of blades 18 has converged to within a predetermined tolerance.

Some further details on how the streamed or received accelerometer data is used are now described. As wind tower excitation is a function of the wind turbine operating condition, then the operating condition should be the same or substantially similar for all of the different configurations to ensure that a consistent or meaningful comparison is made, i.e. the operating condition should be the same when measuring accelerometer data for all of the plurality of different pitch angles of one of the blades. Examples of parameters that are part or function of the operating condition and may influence tower excitation are average wind speed, air density, and rotor speed.

It is, however, very difficult or even impossible maintain a constant operating condition across the predetermined period of time in which accelerometer data is collected for a particular configuration. Some steps may therefore be taken to mitigate this issue. In one example, accelerometer data is streamed in each configuration for an extended period, e.g. the predetermined period may be a period of several hours or even days. Within this extended predetermined period, the received accelerometer data is binned or split into individual time intervals within the predetermined period. As an illustrative example, each individual time interval may be 10 minutes; however, any suitable time interval may be used. This will result in N bins of received sensor data for each particular configuration.

The controller 26 is configured to calculate a mean operating condition for each of the N bins based on the respective received sensor output data. For the received accelerometer data associated with a particular bin to be suitable or valid for determining a corrected pitch reference, then the mean operating condition for the particular bin needs to be within a certain or predetermined tolerance. The controller 26 is configured to select a particular one of the time intervals in which the mean operating condition is within the predetermined tolerance. The controller 26 determines the fatigue content for that particular configuration based on the sensor output data of the selected particular time interval. The controller 26 repeats this process for each of the different configurations, i.e. different pitch angles, of one of the blades to determine the corrected pitch reference based on the sensor output data of the selected particular time interval of each configuration.

Figure 4:
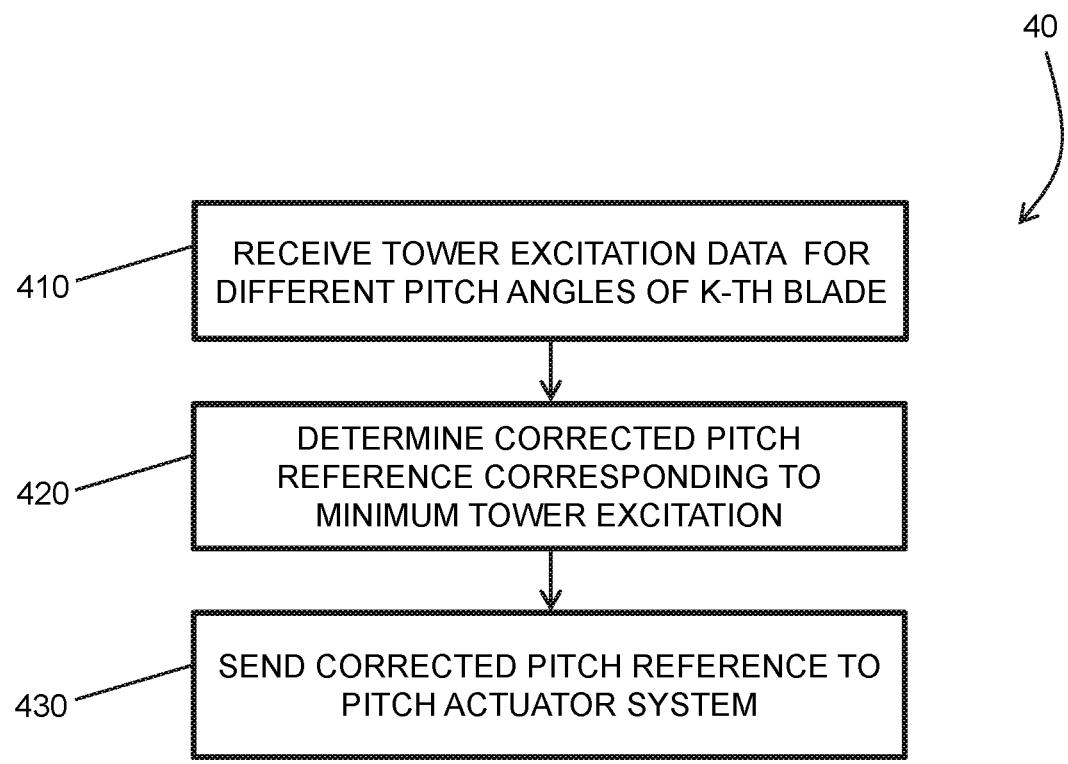

FIG. 4 summarises the steps of a method 40 performed by the controller 26 to determine a corrected pitch reference for each of the blades 18 of the wind turbine 10. This may also be regarded as dynamic pitch calibration method or procedure for the blades 18 of the wind turbine 10. At step 410, sensor output data is received from one or more wind turbine sensors 141. In the described example, the wind turbine sensors 141 include one or more accelerometers 141. The sensor output data includes data indicative of excitation of the wind turbine tower 12 for a plurality of different pitch angles of a particular one of the blades 18. In the described example, the wind turbine 10 is operated for a predetermined period with the particular blade 18 at each of the different pitch angles while the pitch of the other blades 18 is kept constant.

At step 420, a corrected pitch reference of the particular blade is determined. The corrected pitch reference corresponds to a minimum tower excitation based on the received sensor output data. In the described example, a fore-aft directional component of tower excitation is filtered from the received sensor output data—the fore-aft signal may be one of a plurality of signals in the sensor output data—to be used to determine the corrected pitch reference. The fore-aft direction of the wind turbine 10 is the dominant direction in which additional loading, i.e. additional tower excitation, is caused by blade misalignment. In particular, in the described embodiment the fore-aft directional component is used to determine fatigue content, and the corrected pitch reference is determined as the pitch angle corresponding to minimum fatigue.

At step 430, the corrected pitch reference, and/or offset to a current pitch reference, is sent or transmitted to the pitch actuator system 24 of the particular blade 18. The pitch actuator system 24 then corrects the blade pitch of the first blade, as appropriate.

Steps 410, 420 and 430 are repeated for each of the remaining blades 18 other than the first blade 18. Furthermore, once the method steps have been performed successively for each of the blades 18, the method loops back to the first one of the blades 18 and the method steps are repeated again. This process continues until the corrected pitch reference of each of the blades 18 converges to within a prescribed tolerance.

Examples of the invention are advantageous in that excitation or vibration of a wind turbine tower may be reduced or minimised, which can significantly increase the service life of the wind turbine. In particular, the present invention is advantageous in that rotor imbalance—which causes tower excitation—can be remotely identified and corrected. In fact, the present invention may be utilised as part of an automated procedure requiring no human input, e.g. an automatic annual rotor imbalance correction. This is in contrast to known methods in which skilled technicians need to correct for rotor imbalance on-site, resulting in expensive shutdowns in power production of the wind turbine. Furthermore, tower excitation is a consistently measurable and robust wind turbine parameter, and so using tower excitation in a method for correcting pitch misalignment results in a reliable such method.

Examples of the invention are advantageous in that relatively sophisticated sensors, such as blade flap strain gauge sensors, that may only be provided on more modern wind turbines are not needed. Indeed, only sensors that are common to almost all wind turbines, e.g. accelerometers, are needed to perform the present invention. This means that the present invention can be implemented on a far greater number of turbines, including relatively old turbines in which service life may be more of an immediate issue. Furthermore, as the invention uses existing wind turbine hardware then it is relatively cost effective to implement.

Examples of the invention are advantageous in that having rotor blades which are pitched or calibrated correctly can improve the power output of a wind turbine, and may reduce the frequency in which maintenance is needed on the wind turbine.

It will be appreciated that various changes and modifications can be made to the present invention without departing from the scope of the present application.

In the above-described example, the corrected pitch reference angle is determined as being the pitch angle at which the wind turbine has been operated which corresponds to the minimum tower excitation. In different examples, however, data points of the measured tower excitation (specifically, the fatigue content) against pitch angle may be plotted and a curve fitting may be performed to determine the corrected reference pitch. In particular, a minimum turning point of the fitted curve may be used to define the corrected reference pitch. Any suitable curve or spline fitting technique may be used, as will be well understood by the skilled person.

In the above-described example, the wind turbine is operated with one blade at each of a defined plurality of blade pitch angles for a predetermined time period (while keeping the pitch angle of the remaining blades constant) so as to determine a corrected reference pitch for that particular blade. This is then repeated for the other blades. In different examples, instead of operating the wind turbine in such a (controlled) manner to obtain the required tower vibration data, the blade pitch angles and associated tower vibrations may instead be monitored during normal operation of the wind turbine over a period of time. During this period, the required tower vibration data for a variety of pitch angles for a particular blade may be obtained to allow for the corrected reference pitch to be determined.

In the above-described example, the steps in which offset is added to the pitch angle are a constant value, e.g. steps of 0.3 degrees. That is, tower vibrations for a plurality of equally-spaced pitch angles are measured. In different examples, however, tower vibrations may be measured for any suitable range of pitch angles with any suitable minimum and maximum values of the range. When controlling the wind turbine to operate at a plurality of different pitch angles to obtain corresponding tower vibration data then it may be natural to operate the wind turbine at a plurality of equally-spaced pitch angles, although this is not necessary. However, if the required tower vibration data is collected over time during normal operation of the wind turbine then the obtained tower vibration data may be less likely to be for equally-spaced pitch angles.

The invention claimed is:

1. A method of correcting blade pitch in a wind turbine having a tower and a plurality of rotor blades, the method comprising:
receiving sensor output data from one or more wind turbine sensors, the sensor output data including data indicative of excitation of the tower for a plurality of different pitch angles of a particular one of the plurality of rotor blades;
determining a corrected pitch reference of the particular one of the plurality of rotor blades, the corrected pitch reference corresponding to a minimum tower excitation based on the received sensor output data; and,
sending the corrected pitch reference to a pitch actuator system of the particular one of the plurality of rotor blades;
wherein the wind turbine is operated at each of the plurality of different pitch angles of the particular one of the plurality of rotor blades for a predetermined period to receive the sensor output data for the plurality of different pitch angles of the particular one of the plurality of rotor blades, and
wherein for each of the plurality of different pitch angles, the method further comprises:
calculating a mean operating condition of the wind turbine for each of a plurality of time intervals within the predetermined period using the sensor output data; and,
selecting a particular one of the plurality of time intervals in which the mean operating condition is within a predetermined tolerance,
wherein the corrected pitch reference is determined based on the sensor output data of the selected particular one of the plurality of time intervals for each of the plurality of different pitch angles.

2. The method of claim 1, wherein the received sensor output data corresponds to a pitch angle of the remaining plurality of rotor blades being constant.

3. The method of claim 1, wherein determining the corrected pitch reference comprises:
determining a pitch offset from a current pitch reference to the pitch angle corresponding to the minimum tower excitation; and,
determining the corrected pitch reference to be the current pitch reference shifted by the determined pitch offset.

4. The method of claim 3, wherein the sensor output data for the plurality of different pitch angles comprises sensor output data for the current pitch reference.

5. The method of claim 1, wherein determining the corrected pitch reference comprises:
determining a component of tower excitation in a particular direction from the received sensor output data; and,
determining the corrected pitch reference based on the component of tower excitation.

6. The method of claim 5, wherein determining the corrected pitch reference based on the component of tower excitation comprises:

filtering the component of tower excitation for each of the plurality of different pitch angles to determine fatigue content of the tower excitation for each of the plurality of different pitch angles; and,
determining the corrected pitch reference as the pitch angle corresponding to a minimum value of fatigue content.

7. The method of claim 5, wherein the particular direction of the component of tower excitation is a fore-aft direction of the wind turbine tower.

8. The method of claim 1, wherein the mean operating condition is calculated based on at least one of: average wind speed; air density; and, rotor speed.

9. The method of claim 1, wherein, while the particular one of the plurality of rotor blades is maintained at the corrected pitch reference, the method is repeated to determine another corrected pitch reference for another of the plurality of rotor blades.

10. The method of claim 9, comprising performing the method successively for each of the rotor blades until the corrected pitch reference for each of the blades converges to within a prescribed tolerance.

11. The method of claim 1, wherein the one or more wind turbine sensors comprises one or more accelerometers mounted to or in the wind turbine.

12. A wind turbine comprising:
a tower;
a plurality of rotor blades;
one or more wind turbine sensors on the wind turbine; and
a controller operatively coupled to the one or more wind turbine sensors, the controller being configured to:
receive sensor output data from the one or more wind turbine sensors, the sensor output data including data indicative of excitation of the tower for a plurality of different pitch angles of a particular one of the plurality of rotor blades;
determine a corrected pitch reference of the particular one of the plurality of rotor blades corresponding to a minimum tower excitation based on the received sensor output data; and,
send the corrected pitch reference to a pitch actuator system of the particular one of the plurality of rotor blades;
wherein the wind turbine is operated at each of the plurality of different pitch angles of the particular one of the plurality of rotor blades for a predetermined period to receive the sensor output data for the plurality of different pitch angles of the particular one of the plurality of rotor blades, and
wherein for each of the plurality of different pitch angles:
calculate a mean operating condition of the wind turbine for each of a plurality of time intervals within the predetermined period using the sensor output data; and
select a particular one of the plurality of time intervals in which the mean operating condition is within a predetermined tolerance,
wherein the corrected pitch reference is determined based on the sensor output data of the selected particular one of the plurality of time intervals for each of the plurality of different pitch angles.

* * * * *